3,071,622
SULFIDE CLEAVAGE
Robert J. Laufer and Martin B. Neuworth, Pittsburgh, Pa., assignors to Consolidation Coal Company, Pittsburgh, Pa., a corporation of Pennsylvania
No Drawing. Filed Mar. 8, 1961, Ser. No. 94,161
9 Claims. (Cl. 260—609)

This invention relates to the sulfide cleavage of alkyl aryl sulfides. More specifically, it relates to the splitting off of a branched-chain alkyl group attached to the sulfur atom of an alkyl aryl sulfide in the presence of phosphoric acid as a selective sulfide cleavage acid catalyst.

The term "branched-chain alkyl" as used herein refers to an alkyl group whose attaching carbon atom is a secondary or tertiary carbon atom. In C-alkylated thiophenols, the carbon atom of this alkyl group is attached to a nuclear carbon atom (ring). In S-alkylated thiophenols, the carbon atom of this alkyl group is attached to the sulfur atom (sulfide).

The preparation of ring-alkylated thiophenols substituted in the para position of the ring with a t-alkyl group has been described in copending applications Serial Nos. 70,413, 70,405, and 70,443, all filed November 21, 1960, and assigned to the assignee of this invention. The preparation of ring-alkylated thiophenols alkylated in the ortho position of the ring with a sec-alkyl group has been described in copending applications Serial Nos. 70,424, 70,404, and 70,425, all filed November 21, 1960, and assigned to the assignee of this invention. In the foregoing processes for preparing ring-alkylated thiophenols, varying amounts of S-alkylated thiophenols, i.e., alkyl aryl sulfides are produced. Sulfide cleavage is of utility in regenerating the starting thiophenol from the sulfide for recycle in the process for ring-alkylating thiophenols. This invention is of further utility as a step in accomplishing the hitherto unknown separation and recovery of individual thiocresol isomers from mixed thiocresols, as shown in copending application Serial No. 70,657, filed November 21, 1960. In this isomer separation process, a mixture of thiocresol isomers is catalytically reacted with a t-alkyl-generating olefin, only the orthothiocresol isomer being alkylatable in the ring. The meta- and parathiocresols form their t-alkyl sulfides. This invention provides the means for separately recovering both meta- and parathiocresols by individual sulfide cleavage of their respective t-alkyl sulfides.

In marked contrast to the alkyl aryl ethers, e.g., anisole, isopropyl phenyl ether, etc., where side-chain carbon-oxygen cleavage readily occurs, in alkyl aryl sulfides the side-chain carbon-sulfur bond is cleaved with considerable difficulty. A reductive sulfide cleavage of alkyl aryl sulfides is known wherein a primary group, e.g., methyl may be removed from a compound such as thioanisole by using a reducing agent, e.g., an alkali metal dissolved in a nitrogenous solvent. Exemplary reducing agents are sodium-liquid ammonia, sodium-pyridine, and lithium-methylamine. The temperature at which these reducing agents are employed is generally determined by the boiling point of the solvent; e.g., sodium-liquid ammonia is generally used at $-33°$ C., the atmospheric boiling point of ammonia; pyridine is used at $115°$ C., its reflux temperature, etc. These reducing agents are basic in nature and operate by a different mechanism from the specific acid catalyst that characterizes this invention in that hydrogenolytic cleavage occurs with these basic reducing agents. Thus when a t-butyl group is cleaved in the presence of sodium-liquid ammonia, isobutylene is not formed, but rather butanes and octanes primarily. These basic reducing agents are not ordinarily as desirable for use as the specific acid catalysts of this invention because the olefins ordinarily derivable from the cleaved alkyl groups are not recoverable as such. Further, the use of these alkali metal-solvent pairs is less convenient compared with use of the catalysts of this invention. Also, the alkali metal-solvent pairs may adversely affect other groups present on the ring, such as halogen.

Experiments have also been reported [D. S. Tarbell and D. P. Harnish, J. Am. Chem. Soc. 74, 1862 (1952)] intended to elucidate a mechanism of cleavage of the carbon-sulfur bond in various phenyl alkyl and phenyl aralkyl sulfides. Aluminum bromide in chlorobenzene, aqueous hydrobromic acid, and hydrogen bromide in acetic acid solution were among the systems studied. The results obtained, characterized by poor yields and thiophenol degradation, emphasize the difficulties involved in obtaining an effective cleavage process of commercial interest.

Accordingly, it is an object of the present invention to provide a method for the effective sulfide cleavage of branched-chain S-alkylated thiophenols.

It is a further object to provide a method for effectively cleaving t-alkyl group attached to the sulfur atom of a t-alkyl aryl sulfide.

It is another object to provide a method for effectively cleaving a sec-alkyl group attached to the sulfur atom of a sec-alkyl aryl sulfide.

It is yet a further object to provide a sulfide cleavage process for cleaving branched-chain S-alkylated thiophenols in high yield and in high purity.

It is still a further object to provide a sulfide cleavage process of commercial utility wherein both thiophenols and olefins are recovered from corresponding S-alkylated thiophenols in high yield and in high purity.

In accordance with this invention, sulfide cleavage of a branched-chain alkyl aryl sulfide is accomplished by reacting the sulfide in the presence of phosphoric acid as sulfide cleavage catalyst at a selected temperature between about $100°$ and $400°$ C. The sulfide cleavage of S-alkylated thiophenols specifically includes the removal of a t-alkyl or sec-alkyl group attached to the sulfur atom. This catalyst finds its preferred utility in removing the t-alkyl group. Removal of a sec-alkyl group is considerably more difficult to accomplish with this catalyst than removal of a t-alkyl group and requires a higher temperature and intimate contact for effective cleavage. The removal of a t-alkyl group is preferably accomplished at a temperature between $125$ and $250°$ C. The removal of a sec-alkyl group is preferably accomplished at a temperature between $250$ and $350°$ C. under pressurized conditions. At too low a temperature, cleavage is essentially ineffectual; at too high a temperature, undesired side products are formed due to degradation and polymerization.

While catalyst concentration is not critical per se, since heterogeneous catalysis is involved too low a catalyst concentration results in a marked increase in reaction time. Catalyst concentrations of from 1 to 20 percent are preferred. Depending upon the alkyl group to be removed, the reaction temperature used, and the catalyst concentration present, reaction times for liquid phase reactions ranging from 10 minutes to 12 hours are suitable, lower temperatures requiring longer reaction times. Preferred branched-chain alkyl substituents attached to the sulfur atom include from 3 to 16 carbon atoms. Using the catalysts of this invention, it has been found that the cleavage of a higher molecular weight branched-chain alkyl substituent such as sec-butyl proceeds in the same manner and with at least equal effectiveness compared with the cleavage of alkyl groups of lower molecular weight such as isopropyl.

The choice of catalyst is a significant factor in achieving sulfide cleavage in yields of practical significance and of commercial utility. A successful catalyst for accomplishing sulfide cleavage must actively and selectively remove the t-alkyl or sec-alkyl group attached to the sulfur atom without causing (a) desulfurization of the S-alkylated thiophenol or the cleaved product or (b) significant polymerization of the cleaved products. Thus the evolved olefin should be recoverable as such for reuse in the process. It is further desirable that the catalyst be relatively inexpensive or have a sufficiently long life with respect to its catalytic activity. It should also be chemically stable and inert with respect to the various reactants and reaction products, particularly because of the elevated temperatures generally required for effective sulfide cleavage.

Phosphoric acid as a sulfide cleavage catalyst has been found to provide the foregoing requirements. The preferred phosphoric acid for use in practicing this invention is the ordinary commercially available type of concentrated phosphoric acid consisting of approximately 85 percent by weight of orthophosphoric acid in aqueous solution. While this commercial phosphoric acid may be diluted with water or made more concentrated, no process advantages are obtained thereby. Using a diluted phosphoric acid will only require increased quantities of catalyst. While 100 percent phosphoric acid is at least equally effective in the practice of this invention, it is not so readily available and affords no apparent process advantage. One hundred percent phosphoric acid may be readily prepared by reacting equimolar quantities of 85 percent orthophosphoric acid with phosphorus pentoxide. Other techniques for concentrating the acid may be used such as dehydration of the 85 percent orthophosphoric acid forming polyphosphoric acids. Thus, while not intended to restrict the scope of this invention, exemplification thereof made herein, unless otherwise indicated, is to the ordinary 85 percent orthophosphoric acid of commerce.

The reactions that occur during sulfide cleavage are relatively complex and for certain compounds mechanistically may involve disproportionation, isomerization, and desulfurization, as well as the desired sulfide cleavage. However, it has been found that by using the process of this invention in conjunction with a relatively simple selective distillation technique, high yields of thiophenol obtained by sulfide cleavage of the alkyl aryl sulfide may be obtained wholly independent of the possible interim formation of undesired side products. In such a technique, particularly effective herein for the cleavage of t-alkyl aryl sulfides, the sulfide is heated in the presence of a catalyst to a desired sulfide cleavage temperature. The column temperature and pressure are coordinately controlled so that the only product that escapes, other than evolved olefins, is the desired thiophenol, which will be lower boiling than the starting S-alkylated reactant. Any S-alkylated reactant is returned to the distillation vessel by reflux. It has been found that a packed distillation column provides a desired scrubbing action so that the evolved thiophenol is obtained in a high degree of purity, other products being returned to the vessel for reflux. It is also apparent that in removing the cleaved thiophenolic product by this technique, equilibrium is not attained, the reaction being shifted toward formation of additional thiophenol.

It has also been found advantageous in certain instances, particularly in cleaving the more difficultly cleavable sec-alkyl aryl sulfides, to incorporate an inert hydrocarbon oil, e.g., a high boiling paraffin oil, to increase the temperature in the reaction vessel. Thereby, the sulfides may be cleaved at temperatures above their atmospheric boiling point. Also, improvements in conversion and yield, in certain instances, result. With some of the more difficultly cleavable sulfides, reaction in an autoclave at elevated temperatures to 400° C. under superatmospheric pressure to 5000 lb. p.s.i.g. may also be required.

The following examples are intended as illustrative and expository of the invention, and are not to be considered as limitations thereof. All product yields therein are in mole percent of converted sulfide.

EXAMPLE 1

Sulfide Cleavage of t-Butyl Phenyl Sulfide

A 115-gram sample of t-butyl phenyl sulfide was charged to a distilling flask along with 4.3 percent by weight of 85 percent orthophosphoric acid in aqueous solution, and the flask was then placed on a distilling column. The mixture was heated under atmospheric reflux at a reaction temperature between 179 and 185° C. for 6 hours. Both the column temperature and the reflux ratio were adjusted so as to return unreacted material to the reactor, thereby promoting conversion to the final desired product. Product distillate was redistilled prior to analysis. Eighty percent of the sulfide was converted, a yield of 95 percent of thiophenol and 95 percent of isobutylene being obtained.

EXAMPLE 2

Sulfide Cleavage of t-Butyl Phenyl Sulfide

One hundred percent phosphoric acid was prepared by slowly adding phosphorus pentoxide to a vigorously stirred and cooled equimolar quantity of 85 percent orthophosphoric acid at a rate so as to maintain the temperature below 85° C. Approximately 15 minutes was required for the phosphorus pentoxide addition. The resultant 100 percent phosphoric acid liquid was colorless and clear.

Following the procedure shown in Example 1, a sample of t-butyl phenyl sulfide was reacted with 9 percent by weight of the 100 percent phosphoric acid at a temperature of 185° C. for 6½ hours. An 85 percent conversion of the sulfide occurred, a 90 percent yield of thiophenol being obtained.

EXAMPLE 3

Sulfide Cleavage of t-Butyl 4-Chlorophenyl Sulfide

Ninety grams of t-butyl 4-chlorophenyl sulfide was reacted with 4.5 percent by weight of 85 percent orthophosphoric acid at a temperature of 197–212° C. for 5.5 hours under atmospheric reflux, following the procedure shown in Example 1. Sixty-six percent of the sulfide was converted, a 98 percent yield of 4-chlorothiophenol and a 92 percent yield of isobutylene being obtained.

EXAMPLE 4

Sulfide Cleavage of Isopropyl Phenyl Sulfide

A 300-milliliter rocking autoclave was charged with isopropyl phenyl sulfide and 8 percent by weight of 85 percent orthophosphoric acid. The autoclave was brought to a temperature of 290° C. and maintained at temperature for 30 minutes, at which time a pressure in excess of 3000 p.s.i.g. was developed. The autoclave was cooled and the products recovered, 94 percent by weight of isopropyl phenyl sulfide being converted. A 17 percent yield of thiophenol was obtained.

In a similar autoclave run, 10 percent by weight of 85 percent orthophosphoric acid was reacted with isopropyl phenyl sulfide at a temperature of 230–250° C. for 90 minutes. At maximum temperature, a pressure of 620 p.s.i.g. was developed. Eighty-one percent of the isopropy phenyl sulfide was converted, a 27 percent yield of thiophenol being obtained.

It will of source be readily apparent that many variants of the process of this invention may be employed depending upon the sulfide being cleaved and the specific reaction parameters used such as catalyst concentration, reaction temperature, time of reaction, and the like. Also, a batch technique or a semi-continuous or continuous process may be employed. These variants are considered as falling within the scope of this invention which should be determined in accordance with the objects and claims thereof.

We claim:

1. The process for sulfide cleaving an alkyl aryl sulfide containing a branched-chain alkyl group attached to the sulfur atom which comprises heating said sulfide at a temperature between about 100 and 400° C. in the presence of phosphoric acid as a sulfide cleavage acid catalyst to form the corresponding thiophenol and an olefin corresponding to said branched-chain alkyl group.

2. The process according to claim 1 wherein said catalyst is an aqueous solution of about 85 percent by weight of orthophosphoric acid.

3. The process for sufide cleaving an alkyl aryl sulfide containing a branched-chain alkyl group attached to the sulfur atom to form a lower boiling thiophenol in high yield which comprises heating said sufide at a temperature between about 100 and 400° C. in the presence of phosphoric acid as a selective sulfide cleavage acid catalyst to form said lower boiling thiophenol and an olefin corresponding to said branched-chain alkyl group, and recovering at least the lower boiling thiophenol in high yield.

4. The process for sulfide cleaving an alkyl aryl sulfide containing a t-alkyl group attached to the sulfur atom which comprises heating said sulfide in the presence of phosphoric acid as a selective sulfide cleavage acid catalyst at a temperature between 125 and 250° C. to form the corresponding thiophenol and an olefin corresponding to said t-alkyl group.

5. The process according to claim 4 wherein said catalyst is an aqueous solution of about 85 percent by weight of orthophosphoric acid.

6. The process for sulfide cleaving an alkyl aryl sulfide containing a sec-alkyl group attached to the sulfur atom which comprises heating said sulfide in the presence of phosphoric acid as sulfide cleavage acid catalyst at a temperature between 250 and 350° C. under superatmospheric pressure to form the corresponding thiophenol and an olefin corresponding to said sec-alkyl group.

7. The process for sulfide cleaving an alkyl aryl sulfide containing a t-alkyl group attached to the sulfur atom to form a lower boiling thiophenol in high yield, which comprises charging the sulfide and phosphoric acid as sulfide cleavage catalyst to a distillation apparatus including a reaction vessel and a distillation column, heating said sulfide at a cleavage temperature between about 125 and 250° C. under reflux conditions to form said lower boiling thiophenol and an olefin corresponding to said t-alkyl group, maintaining the vessel and the column at a selected temperature so that unreacted sulfide is returned to the reaction vessel and said olefin and lower boiling formed thiophenol are permitted to escape from the column, and recovering at least said lower boiling thiophenol in high yield.

8. The process according to claim 7 wherein said catalyst is an aqueous solution of about 85 percent by weight of orthophosphoric acid.

9. The process according to claim 8 wherein t-butyl phenyl sulfide is cleaved and thiophenol is recovered in high yield.

References Cited in the file of this patent

Reid: Organic Chemistry of Bivalent Sulfur, vol. 2, page 61 (1960), Chemical Publishing Co., New York, N.Y.